(12) United States Patent
Bendahan et al.

(10) Patent No.: US 8,389,941 B2
(45) Date of Patent: Mar. 5, 2013

(54) COMPOSITE GAMMA-NEUTRON DETECTION SYSTEM

(75) Inventors: Joseph Bendahan, San Jose, CA (US); Edward James Morton, Guildford (GB)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 12/976,861

(22) Filed: Dec. 22, 2010

(65) Prior Publication Data

US 2011/0204243 A1 Aug. 25, 2011

Related U.S. Application Data

(63) Continuation-in-part of application No. 12/997,251, filed as application No. PCT/GB2009/001444 on Jun. 11, 2009.

(60) Provisional application No. 61/289,207, filed on Dec. 22, 2009.

(30) Foreign Application Priority Data

Jun. 11, 2008 (GB) .................................. 0810638.7

(51) Int. Cl.
 *G01T 1/164* (2006.01)
(52) U.S. Cl. ................................................. 250/363.02
(58) Field of Classification Search ............ 250/390.01–390.12, 391–395, 269.1–269.8
See application file for complete search history.

(56) References Cited

U.S. PATENT DOCUMENTS

| | | | |
|---|---|---|---|
| 2,831,123 A | 4/1958 | Daly | |
| 3,676,783 A * | 7/1972 | Kinbara et al. | 327/70 |
| 3,766,387 A | 10/1973 | Heffan et al. | |
| 3,767,850 A * | 10/1973 | McMillian et al. | 358/474 |
| 3,770,955 A | 11/1973 | Tomita et al. | |
| 3,784,837 A | 1/1974 | Holmstrom | |
| RE28,544 E | 9/1975 | Stein et al. | |
| 3,904,923 A | 9/1975 | Schwartz | |
| 4,047,035 A | 9/1977 | Dennhoven et al. | |
| 4,139,771 A | 2/1979 | Dennhoven et al. | |

(Continued)

FOREIGN PATENT DOCUMENTS

| EP | 0287707 | 11/1982 |
|---|---|---|
| EP | 00077018 | 4/1983 |

(Continued)

OTHER PUBLICATIONS

"Mobile X-Ray Inspection Systems", Internet Citation, Feb. 12, 2007, pp. 1-2, URL:http://web.archive.org/web/20070212000928/http://www.bombdetection,com/cat_details.php?catid=20>.

(Continued)

*Primary Examiner* — Kiho Kim
(74) *Attorney, Agent, or Firm* — Novel IP

(57) ABSTRACT

The present invention provides a gamma-neutron detector based on mixtures of thermal neutron absorbers that produce heavy-particle emission following thermal capture. The detector consists of one or more thin screens embedded in transparent hydrogenous light guides, which also serve as a neutron moderator. The emitted particles interact with the scintillator screen and produce a high light output, which is collected by the light guides into a photomultiplier tube and produces a signal from which the neutrons are counted. Simultaneous gamma-ray detection is provided by replacing the light guide material with a plastic scintillator. The plastic scintillator serves as the gamma-ray detector, moderator and light guide. The neutrons and gamma-ray events are separated employing Pulse-Shape Discrimination (PSD). The detector can be used in several scanning configurations including portal, drive-through, drive-by, handheld and backpack, etc.

15 Claims, 9 Drawing Sheets

U.S. PATENT DOCUMENTS

| | | |
|---|---|---|
| 4,210,811 A | 7/1980 | Dennhoven et al. |
| 4,216,499 A | 8/1980 | Kunze et al. |
| 4,366,382 A | 12/1982 | Kotowski |
| 4,430,568 A | 2/1984 | Yoshida et al. |
| 4,566,113 A | 1/1986 | Donges et al. |
| 4,599,740 A | 7/1986 | Cable |
| 4,626,688 A | 12/1986 | Barnes |
| 4,641,330 A | 2/1987 | Herwig et al. |
| 4,709,382 A | 11/1987 | Sones |
| 4,736,401 A | 4/1988 | Donges et al. |
| 4,788,704 A | 11/1988 | Donges et al. |
| 4,817,123 A | 3/1989 | Sones et al. |
| 4,825,454 A | 4/1989 | Annis et al. |
| 4,872,188 A | 10/1989 | Lauro et al. |
| 4,884,289 A | 11/1989 | Glockmann et al. |
| 4,979,202 A | 12/1990 | Siczek et al. |
| 4,991,189 A | 2/1991 | Boomgaarden et al. |
| 5,022,062 A | 6/1991 | Annis |
| 5,065,418 A | 11/1991 | Bermbach et al. |
| 5,091,924 A | 2/1992 | Bermbach et al. |
| 5,098,640 A | 3/1992 | Gozani et al. |
| 5,179,581 A | 1/1993 | Annis |
| 5,181,234 A | 1/1993 | Smith |
| 5,182,764 A | 1/1993 | Peschmann et al. |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis et al. |
| 5,313,511 A | 5/1994 | Annis et al. |
| 5,367,552 A | 11/1994 | Peschmann |
| 5,379,334 A | 1/1995 | Zimmer et al. |
| 5,493,596 A | 2/1996 | Annis |
| 5,548,123 A | 8/1996 | Perez-Mendez et al. |
| 5,606,167 A | 2/1997 | Miller |
| 5,638,420 A | 6/1997 | Armistead |
| 5,642,393 A | 6/1997 | Krug et al. |
| 5,642,394 A | 6/1997 | Rothschild |
| 5,666,393 A | 9/1997 | Annis |
| 5,687,210 A | 11/1997 | Maitrejean et al. |
| 5,692,028 A | 11/1997 | Geus et al. |
| 5,751,837 A | 5/1998 | Watanabe et al. |
| 5,764,683 A | 6/1998 | Swift et al. |
| 5,768,334 A | 6/1998 | Maitrejean et al. |
| 5,787,145 A | 7/1998 | Geus |
| 5,805,660 A | 9/1998 | Perion et al. |
| 5,838,759 A | 11/1998 | Armistead |
| 5,903,623 A | 5/1999 | Swift et al. |
| 5,910,973 A | 6/1999 | Grodzins |
| 5,930,326 A | 7/1999 | Rothschild et al. |
| 5,940,468 A | 8/1999 | Huang et al. |
| 5,974,111 A | 10/1999 | Krug et al. |
| 6,031,890 A | 2/2000 | Bermbach et al. |
| 6,058,158 A | 5/2000 | Eiler |
| 6,067,344 A | 5/2000 | Grodzins et al. |
| 6,081,580 A | 6/2000 | Grodzins et al. |
| 6,094,472 A | 7/2000 | Smith |
| 6,151,381 A | 11/2000 | Grodzins et al. |
| 6,188,747 B1 | 2/2001 | Geus et al. |
| 6,192,101 B1 | 2/2001 | Grodzins |
| 6,192,104 B1 | 2/2001 | Adams |
| 6,195,413 B1 | 2/2001 | Geus et al. |
| 6,198,795 B1 | 3/2001 | Naumann et al. |
| 6,218,943 B1 | 4/2001 | Ellenbogen |
| 6,249,567 B1 | 6/2001 | Rothschild et al. |
| 6,252,929 B1 | 6/2001 | Swift et al. |
| 6,256,369 B1 | 7/2001 | Lai |
| 6,278,115 B1 | 8/2001 | Annis et al. |
| 6,282,260 B1 | 8/2001 | Grodzins |
| 6,292,533 B1 | 9/2001 | Swift et al. |
| 6,301,326 B2 | 10/2001 | Bjorkholm |
| 6,320,933 B1 | 11/2001 | Grodzins et al. |
| 6,347,132 B1 | 2/2002 | Annis |
| 6,356,620 B1 | 3/2002 | Rothschild et al. |
| 6,424,695 B1 | 7/2002 | Grodzins et al. |
| 6,434,219 B1 | 8/2002 | Rothschild et al. |
| 6,435,715 B1 | 8/2002 | Betz et al. |
| 6,442,233 B1 | 8/2002 | Grodzins et al. |
| 6,445,765 B1 | 9/2002 | Frank et al. |
| 6,453,003 B1 | 9/2002 | Springer et al. |
| 6,453,007 B2 | 9/2002 | Adams et al. |
| 6,456,684 B1 | 9/2002 | Mun et al. |
| 6,459,761 B1 | 10/2002 | Grodzins et al. |
| 6,459,764 B1 | 10/2002 | Chalmers et al. |
| 6,473,487 B1 | 10/2002 | Le |
| RE37,899 E | 11/2002 | Grodzins et al. |
| 6,483,894 B2 | 11/2002 | Hartick et al. |
| 6,507,025 B1 | 1/2003 | Verbinski et al. |
| 6,532,276 B1 | 3/2003 | Hartick et al. |
| 6,542,574 B2 | 4/2003 | Grodzins |
| 6,542,578 B2 | 4/2003 | Ries et al. |
| 6,542,580 B1 | 4/2003 | Carver et al. |
| 6,546,072 B1 | 4/2003 | Chalmers |
| 6,552,346 B2 | 4/2003 | Verbinski et al. |
| 6,563,903 B2 | 5/2003 | Kang et al. |
| 6,580,778 B2 | 6/2003 | Meder |
| 6,584,170 B2 | 6/2003 | Aust et al. |
| 6,597,760 B2 | 7/2003 | Beneke et al. |
| 6,606,516 B2 | 8/2003 | Levine |
| 6,636,581 B2 | 10/2003 | Sorenson |
| 6,653,588 B1 | 11/2003 | Gillard-Hickman |
| 6,658,087 B2 | 12/2003 | Chalmers et al. |
| 6,663,280 B2 | 12/2003 | Doenges |
| 6,665,373 B1 | 12/2003 | Kotowski et al. |
| 6,665,433 B2 | 12/2003 | Roder |
| 6,763,635 B1 | 7/2004 | Lowman |
| 6,785,357 B2 | 8/2004 | Bernardi et al. |
| 6,812,426 B1 | 11/2004 | Kotowski et al. |
| 6,816,571 B2 | 11/2004 | Bijjani et al. |
| 6,837,422 B1 | 1/2005 | Meder |
| 6,839,403 B1 | 1/2005 | Kotowski et al. |
| 6,843,599 B2 | 1/2005 | Le et al. |
| 6,920,197 B2 | 7/2005 | Kang et al. |
| 7,039,159 B2 | 5/2006 | Muenchau et al. |
| 7,166,844 B1 | 1/2007 | Gormley et al. |
| 7,207,713 B2 | 4/2007 | Lowman |
| 7,244,947 B2 | 7/2007 | Polichar et al. |
| 7,372,040 B2 | 5/2008 | Polichar et al. |
| 7,525,101 B2 * | 4/2009 | Grodzins ................ 250/390.11 |
| 2004/0017888 A1 | 1/2004 | Seppi et al. |
| 2004/0086078 A1 | 5/2004 | Adams et al. |
| 2004/0125914 A1 | 7/2004 | Kang et al. |
| 2004/0141584 A1 | 7/2004 | Bernardi et al. |
| 2004/0258198 A1 | 12/2004 | Carver et al. |
| 2005/0023479 A1 | 2/2005 | Grodzins |
| 2005/0117700 A1 | 6/2005 | Peschmann |
| 2005/0135668 A1 | 6/2005 | Polichar et al. |
| 2005/0156734 A1* | 7/2005 | Zerwekh et al. ........... 340/539.1 |
| 2005/0157842 A1 | 7/2005 | Agrawal et al. |
| 2005/0161611 A1* | 7/2005 | Disdier et al. ........... 250/370.11 |
| 2005/0169421 A1 | 8/2005 | Muenchau et al. |
| 2005/0275545 A1* | 12/2005 | Alioto et al. .................. 340/600 |
| 2006/0027751 A1 | 2/2006 | Kurita |
| 2006/0284094 A1 | 12/2006 | Inbar |
| 2007/0110215 A1 | 5/2007 | Hu et al. |
| 2007/0140423 A1 | 6/2007 | Foland |
| 2007/0172129 A1 | 7/2007 | Tortora |
| 2007/0189454 A1 | 8/2007 | Georgeson et al. |
| 2007/0210255 A1 | 9/2007 | Bjorkholm |
| 2007/0228284 A1 | 10/2007 | Polichar et al. |
| 2007/0269005 A1 | 11/2007 | Chalmers et al. |
| 2007/0280416 A1 | 12/2007 | Bendahan et al. |
| 2007/0280502 A1 | 12/2007 | Paresi et al. |
| 2007/0286337 A1 | 12/2007 | Wang et al. |
| 2008/0044801 A1 | 2/2008 | Modica et al. |
| 2008/0084963 A1 | 4/2008 | Clayton |
| 2008/0128624 A1 | 6/2008 | Cooke et al. |
| 2008/0304622 A1 | 12/2008 | Morton |
| 2009/0127459 A1 | 5/2009 | Neustadter et al. |
| 2009/0140158 A1* | 6/2009 | Clothier et al. .......... 250/390.11 |
| 2009/0200480 A1* | 8/2009 | Clothier et al. .......... 250/390.01 |

FOREIGN PATENT DOCUMENTS

| | | |
|---|---|---|
| EP | 0176314 | 4/1986 |
| EP | 0919186 | 6/1999 |
| EP | 1413898 | 4/2004 |
| WO | WO9855851 | 10/1998 |

| WO | WO 2004010127 | 1/2004 |
| WO | WO 2005098400 | 10/2005 |
| WO | WO2006/036076 | 4/2006 |
| WO | WO2006/045019 | 4/2006 |
| WO | WO2006/078691 | 7/2006 |
| WO | WO2006095188 | 9/2006 |
| WO | WO2007/035359 | 3/2007 |
| WO | WO2007/051092 | 5/2007 |
| WO | WO 2008/017983 | 2/2008 |
| WO | WO 2011/087861 | 7/2011 |

OTHER PUBLICATIONS

Molchanov et al., "Nanosecond Gated Optical Sensors for Ocean Optic Applications," Sensors Applications Symposium, 2006, Proceedings of the 2006 IEEE, Feb. 7, 2006, 147-150.

International Search Report PCT/GB2009/000515, Feb. 23, 2010, Rapiscan Security Products, Inc.

Search Report PCT/GB2009/000497, Jan. 26, 2010, Rapiscan Security Products, Inc.

International Search Report PCT/GB2009/001444, Dec. 17, 2009, Rapiscan Security Products.

Search Report for WO2009/106847, Sep. 3, 2009, Rapiscan Security Products.

International Search Report PCT/GB2009/001277, May 20, 2008, Rapiscan Systems, Inc.

International Search Report PCT/GB2009/001275, Nov. 26, 2009, Rapiscan Security Products, Inc.

International Search Report PCT/GB2009/001250, May 20, 2009, Rapiscan Security Products Search Report for WO 2011/087861, May 31, 2012, Rapiscan Systems, Inc.

* cited by examiner

COMPOSITE GAMMA-NEUTRON DETECTION SYSTEM

CROSS-REFERENCE TO RELATED APPLICATIONS

The present application relies on U.S. Patent Provisional Application No. 61/289,207, entitled "Composite Gamma Neutron Detection System", and filed on Dec. 22, 2009. In addition, the present application is a continuation-in-part of U.S. patent application Ser. No. 12/997,251, entitled "Photomultiplier and Detection Systems", filed on Mar. 7, 2011, for priority, which is herein incorporated by reference in its entirety, which is a national stage application of PCT/GB2009/001444, filed on Jun. 11, 2009 and which relies on Great Britain Patent Application Number 0810638.7, filed on Jun. 11, 2008, for priority.

FIELD OF THE INVENTION

The present invention generally relates to the field of detection of radioactive materials, specifically to systems and techniques for detecting neutrons and gamma rays and more specifically to a neutron and gamma-ray based detection system and method that is cost-effective, compact, and fabricated from readily available materials.

BACKGROUND OF THE INVENTION

Physical shipment of materials, including the shipment of mail, merchandise, raw materials, and other goods, is an integral part of any economy. Typically, the materials are shipped in a type of shipping containment or cargo box. Such containments or boxes include semi-trailers, large trucks, and rail cars as well as inter-modal containers that can be carried on container ships or cargo planes. However, such shipping or cargo containers can be used for illegal transportation of contraband such as nuclear and radioactive materials. Detection of these threats require a rapid, safe and accurate inspection system for determining the presence of hidden nuclear materials, especially at state and national borders, along with transit points such as airports and shipping ports.

Currently, both passive and active detection techniques are employed for the detection of concealed nuclear materials. Passive detection techniques are based on the principle that nuclear and radiological threats emit gamma, and in some cases neutron, radiation that can be detected. Although passive detection systems can be easily deployed, they suffer from a number of drawbacks, including high rates of false positives and misdetections caused by unavoidable factors such as depression of the natural background by the vehicle being scanned and its contents, variation in natural background spectrum due to benign cargo such as clay tiles, fertilizers, etc., and the presence of radio therapeutic isotopes in the cargo with gamma lines at or near threat lines. Further, many gamma sources are self-shielded and/or can readily be externally shielded, which makes them difficult to detect, since the radiation is absorbed in the shielding. Also, in general, gamma detectors make poor neutron detectors and good neutron detectors tend to be poor gamma detectors.

Other detection techniques employ uncharged particles, such as neutrons and photons (gamma rays) to irradiate suspicious containers. Uncharged particles have the potential to penetrate relatively large dense objects to identify particular elements of interest; thus, some detection devices utilize the absorption and/or scattering patterns of neutrons or photons as they interact with certain elements present in the object being inspected. Examples of such devices can be found in U.S. Pat. Nos. 5,006,299 and 5,114,662, which utilize thermal neutron analysis (TNA) techniques for scanning luggage for explosives, and in U.S. Pat. No. 5,076,993 which describes a contraband detection system based on pulsed fast neutron analysis (PFNA). All the aforementioned patents are incorporated herein by reference.

Active detection techniques, such as Differential Dieaway Analysis (DDA) and measurements of delayed gamma-ray and neutrons following either neutron- or photon-induced fission, can be used to detect the presence of fissile materials. The radiation is measured with neutron and gamma-ray detectors, preferentially insensitive to each other's radiation. Detection of delayed neutrons is an unequivocal method to detect fissile materials even in the presence of shielding mechanism(s) to hide the nuclear materials and notwithstanding the low background compared to delayed gamma rays. Because the number of delayed neutrons is two orders of magnitude lower than the number of delayed gamma rays, efficient and large area detectors are required for best sensitivity in neutron detection.

Each of the detector systems described above is not without drawbacks. In particular, these devices generally utilize accelerators that produce high energy neutrons with a broad spectrum of energies. The absorption/scattering of neutrons traveling at specific energies is difficult to detect given the large number of neutrons that pass through the object without interaction. Thus, the "fingerprint" generated from the device is extremely small, difficult to analyze, and often leads to significant numbers of false positive or false negative test results.

In addition, known prior art detection systems have limitations in their design and method that prohibit them from achieving low radiation doses, which poses a risk to the personnel involved in inspection as well as to the environment, or prevent the generation of high image quality, which are prerequisites for commercial acceptance.

While the use of both passive and active detection techniques is desirable, what is needed is a neutron and gamma-ray based detection system and method that is cost-effective, compact, and wherein the neutron detector is fabricated from readily available materials.

The most commonly used neutron detector is a He-3 gas proportional chamber. Here, He-3 interacts with a neutron to produce a He-4 ion. This ion is accelerated in the electric field of the detector to the point that it becomes sufficiently energetic to cause ionisation of other gas atoms. If carefully controlled, an avalanche breakdown of the gas can be generated, which results in a measurable current pulse at the output of the detector. By pressurizing the gas, the probability of a passing thermal neutron interacting in the gas can be increased to a reasonable level. However, He-3 is a relative scarce material and it does not occur naturally. This makes the availability and future supply of such detectors somewhat uncertain. Further, a special permit is required to transport pressurized He-3 tubes, which can be cumbersome and potentially problematic.

The most common globally deployed passive radioactive material detectors employ a neutron moderator 105 in an upper portion, having a plurality of He-3 detector tubes 116 embedded therein covered by a lead shield 108 and a lower portion comprising a plastic scintillator and moderator 110 with a PMT 115 embedded therein, as shown in FIG. 1A. This detector configuration, however, still employs the scarce He-3. In addition, another commonly deployed detector where the gamma-ray and neutron detectors are separate is shown in FIG. 1B. As shown in FIG. 1B, neutron moderator 105, comprising a plurality of He-3 detector tubes 116 is positioned adjacent to plastic scintillator 110, comprising a PMT 115 and a lead shield 108. This detector configuration, however, still employs the scarce He-3 and takes up a larger footprint.

Several alternative detectors to replace He-3 detectors have been identified. However, many of these detectors are also sensitive to gamma rays, which is not acceptable in applications where neutrons must be discriminated from gamma rays.

Therefore, what is needed is a neutron and gamma-ray based detection system and method that is cost-effective, compact, and wherein the neutron detector is fabricated from readily available materials. In addition, what is needed is a cost-effective and compact detection system in which neutron and gamma-ray detectors are separate.

SUMMARY OF THE INVENTION

In one embodiment, the present invention is a system for detection of neutrons and gamma rays, comprising: a plurality of scintillator screens comprising thermal neutron absorber materials, said materials interacting with neutrons to emit heavy particles, and said heavy particles interacting with scintillator screens to produce light, a plurality of light guides into which said scintillator screens are embedded, said light guides serving as a neutron moderating medium, a first photodetector which receives the produced light through said light guides, and converts the light to a measurable signal, a plastic scintillator producing light on interaction with gamma-rays, a reflector placed between said plastic scintillator and said scintillator screens to prevent cross-contamination between optical signals from the neutron and gamma detection materials, and a second photodetector which collects the produced light from said plastic scintillator, and converts the light to a measurable signal.

In one embodiment, the system further comprises a first counter and a second counter for counting the pulses generated by the first photodetector and the second photodetector, respectively. In one embodiment, second counter is a Multi-Channel Analyzer (MCA) that is used to measure the spectra of the gamma rays.

In one embodiment, the thermal neutron absorber materials comprise $^6$Li or $^{10}$B.

In one embodiment, the plastic scintillator comprises polyvinyl toluene (PVT).

In one embodiment, the system of the present invention further comprises a Pulse-Shape Discrimination (PSD) circuit that separates the neutron and gamma-ray events measured by the first photodetector.

In another embodiment, the present invention is a system for detection of neutrons and gamma rays, comprising: a plurality of screens comprising of thermal neutron absorber materials, said materials interacting with neutrons to emit heavy particles; a plastic scintillator into which said screens are embedded, said plastic scintillator producing light on interaction with said heavy particles and serving as a neutron moderator and light guide; at least one photodetector which collects the produced light and converts the light to a measurable signal, and a Pulse-Shape Discrimination (PSD) circuit that separates the neutron and gamma-ray events measured by the at least one photodetector.

In one embodiment, the scintillator material is silver activated zinc sulfide (ZnS(Ag)) phosphorous. In one embodiment, the thermal neutron absorber materials comprise $^6$Li or $^{10}$B.

In one embodiment, the system further comprises at least one counter for counting the pulses generated by the at least one photodetector.

In one embodiment, the plastic scintillator is fabricated from polyvinyl toluene (PVT).

In one embodiment, the present invention is a system for detection of neutrons and gamma rays, comprising: a plurality of scintillator screens comprising thermal neutron absorber materials, said materials interacting with neutrons to emit heavy particles, and said heavy particles interacting with scintillator screens to produce light, a plurality of light guides into which said scintillator screens are embedded, said light guides serving as a neutron moderating medium, and a first photodetector which receives the produced light through said light guides, and converts the light to a measurable signal, a plastic scintillator producing light on interaction with gamma-rays, a reflector placed between said plastic scintillator and said scintillator screens to prevent cross-contamination between optical signals from the neutron and gamma detection materials, a second photodetector which collects the produced light from said plastic scintillator, and converts the light to a measurable signal, and a first counter and a second counter for counting the pulses generated by the first photodetector and the second photodetector, respectively. In one embodiment, the second counter is a Multi-Channel Analyzer (MCA) that is used to measure the spectra of the gamma rays.

In another embodiment, the present specification discloses a gamma-neutron detector, comprising: a first gamma-sensitive scintillation panel; a second gamma-sensitive scintillation panel; and a neutron detector, wherein said neutron detector is positioned between the first gamma-sensitive scintillation panel and the second gamma-sensitive scintillation panel. Optionally, the neutron detector comprises a neutron sensitive composite scintillator. The neutron sensitive composite scintillator comprises a mixture of neutron sensitive material and ZnS. The neutron sensitive material comprises Li-6 or B-10. The neutron sensitive material has a density of up to 30% by volume of the neutron sensitive composite scintillator. The gamma-sensitive scintillation panel comprises at least one of an organic solid scintillator, an inorganic solid scintillator, or a liquid scintillator positioned between glass sheets or pieces. The gamma-neutron detector further comprises a glass layer, plastic layer, or any substantially impermeable, transparent material barrier, is placed between the neutron detector and at least one of the first or second gamma-sensitive scintillation panels. The first and second gamma-sensitive scintillation panels and neutron detector are adapted to generate an optical signal and wherein the gamma-neutron detector further comprises at least one photodetector to detect said optical signal.

Optionally, at least one of the first or second gamma-sensitive scintillation panels are thicker than the neutron detector. The first and second gamma-sensitive scintillation panels have a faster decay time than the neutron detector. The pulse shapes of the detected optical signals are analyzed to discriminate between gamma interactions and neutron interactions. The gamma-neutron detector further comprises more than two gamma sensitive scintillation panels and more than one neutron detector. The gamma sensitive scintillation panels and neutron detectors are angled relative to the direction of incoming radiation.

In another embodiment, the present specification discloses a portal gantry detection system having a top, right, and left side wherein said top, left, and right sides each comprise a gamma-neutron detector comprising: a first gamma-sensitive scintillation panel; a second gamma-sensitive scintillation panel; and a neutron detector, wherein said neutron detector is positioned between the first gamma-sensitive scintillation panel and the second gamma-sensitive scintillation panel.

In another embodiment, the present specification discloses a mobile detection system comprising a boom wherein said boom comprises a first gamma-sensitive scintillation panel; a second gamma-sensitive scintillation panel; and a neutron detector, wherein said neutron detector is positioned between the first gamma-sensitive scintillation panel and the second gamma-sensitive scintillation panel.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE INVENTION

Figure 1:
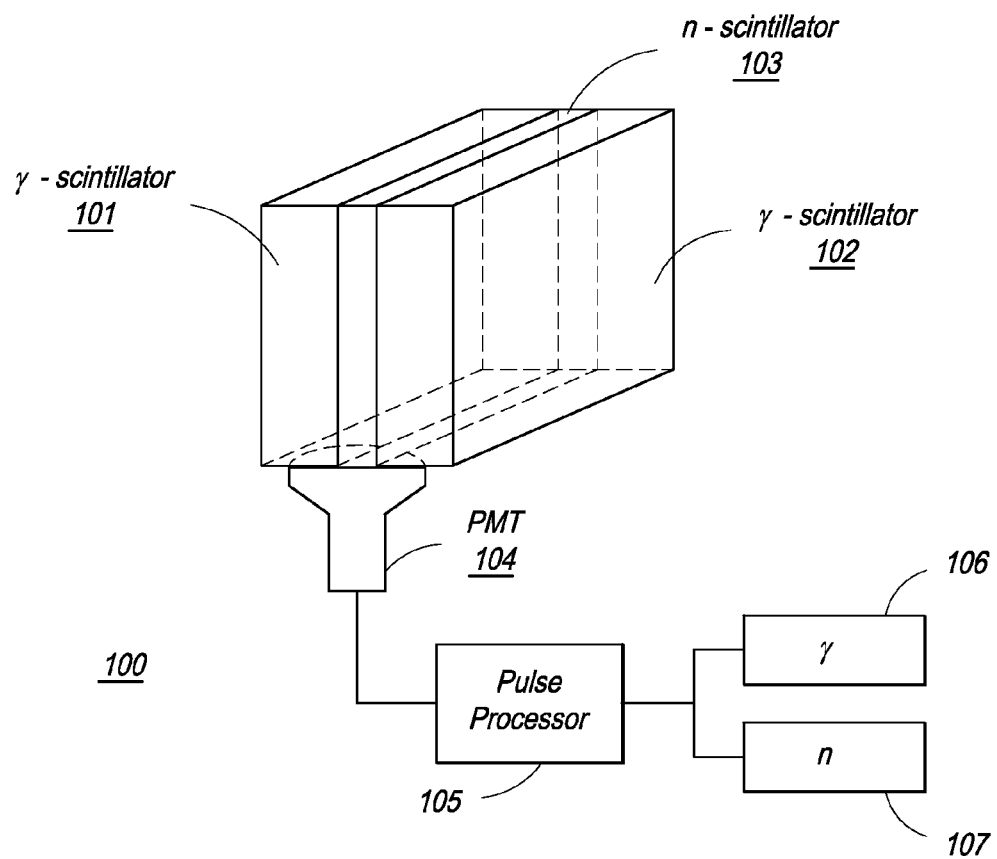
FIG. 1 is a schematic layout of the composite gamma-neutron detector according to one embodiment of the present invention.
Figure 1A:
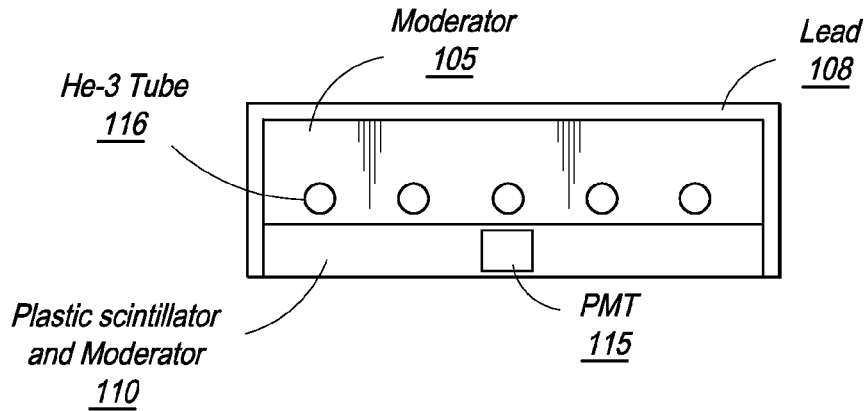
FIG. 1A illustrates a prior art radioactive material detector comprising a neutron moderator and a plastic scintillator, in which He-3 is employed.
Figure 1B:
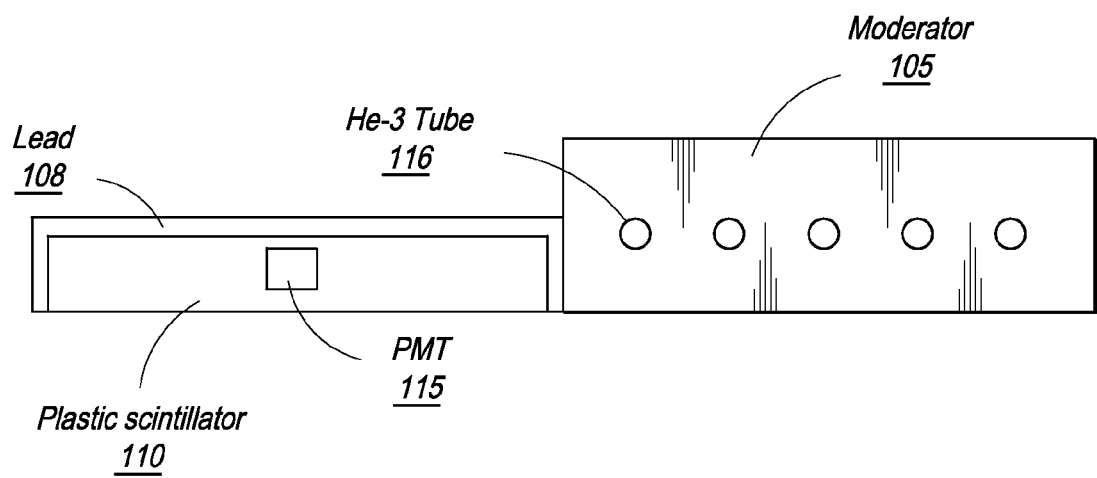
FIG. 1B illustrates a prior art radioactive material detector comprising a neutron moderator and a plastic scintillator, in which He-3 is employed.

The present specification discloses systems and methods for detecting radiological threats using a composite gamma-neutron detector which can be configured to have a high sensitivity for both gamma and neutron detection, with a sufficient separation of the gamma and neutron signatures. The system of the present invention allows for maximum threat detection with minimum false alarms, and thus increased throughput.

Further, the present invention is directed towards a composite gamma-neutron detection system and method that is cost-effective, compact, and wherein the neutron detector is fabricated from readily available materials.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Several nuclei have a high cross-section for detection of thermal neutrons. These nuclei include He, Gd, Cd and two particularly high cross-section nuclei: Li-6 and B-10. In each case, after the interaction of a high cross-section nucleus with a thermal neutron, the result is an energetic ion and a secondary energetic charged particle.

For example, the interaction of a neutron with a B-10 nucleus can be characterized by the following equation:

$$n + B\text{-}10 \rightarrow Li\text{-}7 + He\text{-}4 (945 \text{ barns}, Q = 4.79 \text{ MeV}) \quad \text{Equation 1}$$

Here, the cross section and the Q value, which is the energy released by the reaction, are shown in parenthesis.

Similarly, the interaction of a neutron with a Li-6 nucleus is characterized by the following equation:

$$n + Li\text{-}6 \rightarrow H\text{-}3 + He\text{-}4 (3840 \text{ barn}, Q = 2.79 \text{ MeV}) \quad \text{Equation 2}$$

It is known that charged particles and heavy ions have a short range in condensed matter, generally travelling only a few microns from the point of interaction. Therefore, there is a high rate of energy deposition around the point of interaction. In the present invention, molecules containing nuclei with a high neutron cross section are mixed with molecules that provide a scintillation response when excited by the deposition of energy. Thus, neutron interaction with Li-6 or B-10, for example, results in the emission of a flash of light when intermixed with a scintillation material. If this light is transported via a medium to a photodetector, it is then possible to convert the optical signal to an electronic signal, where that electronic signal is representative of the amount of energy deposited during the neutron interaction.

Further, materials such as Cd, Gd and other materials having a high thermal capture cross section with no emission of heavy particles produce low energy internal conversion electrons, Auger electrons, X-rays, and gamma rays ranging in energy from a few keV to several MeV emitted at substantially the same time. Therefore, a layer of these materials, either when mixed in a scintillator base or when manufactured in a scintillator, such as Gadolinium Oxysulfide (GOS) or Cadmium Tungstate (CWO) will produce light (probably less than heavier particles). GOS typically comes with two activators, resulting in slow (on the order of 1 ms) and fast (on the order of 5 μs) decays. CWO has a relatively fast decay constant. Depending on the overall energy, a significant portion of the energy will be deposited in the layer, while some of the electrons will deposit the energy in the surrounding scintillator. In addition, the copious X-rays and gamma rays produced following thermal capture will interact in the surrounding scintillator. Thus, neutron interactions will result in events with both slow and fast decay constants. In many cases, neutron signals will consist of a signal with both slow and fast components (referred to as "coincidence") due to electron interlacing in the layer and gamma rays interacting in the surrounding scintillator.

The scintillation response of the material that surrounds the Li-6 or B-10 nuclei can be tuned such that this light can be transported through a second scintillator, such as a plastic scintillator in one embodiment, with a characteristic which is selected to respond to gamma radiation only. In another embodiment, the material that surrounds the Li-6 or B-10 is not a scintillator, but a transparent non-scintillating plastic resulting in a detector that is only sensitive to neutrons.

Thus, the plastic scintillator is both neutron and gamma sensitive. When a neutron is thermalized and subsequently captured by the H in the detector, a 2.22 MeV gamma ray is also emitted and often detected. In this manner, the present invention achieves a composite gamma-neutron detector capable of detecting neutrons as well as gamma radiation with high sensitivity. Further, the composite detector of the present invention also provides an excellent separation of the gamma and neutron signatures. It should be noted herein that in addition to charged particles, B-10 produces gamma rays. Therefore, in using materials that produce gamma rays following neutron capture, the result may be a detection that looks like gamma rays. Most applications, however, want to detect neutrons; thus, the detector of the present invention is advantageous in that it also detects the neutrons.

FIG. 1 illustrates a schematic layout of the composite gamma-neutron detector 100 according to one embodiment of the present invention. Referring to FIG. 1, the detector design employs two gamma-sensitive scintillation panels (gamma-detectors) 101 and 102 that surround a single neutron detector 103. The neutron detector 103 further comprises a single slab of neutron sensitive composite scintillator, in which nuclei of a neutron sensitive material such as Li-6 or B-10 are mixed with a scintillation material such as ZnS. In one embodiment, a density of 20-30% by volume can be achieved for the neutron sensitive material (such as Li-6) while maintaining an efficient scintillation response from ZnS.

In one embodiment, gamma detector panels can be fabricated from solid scintillation materials (without a substrate) such as, but not limited to organic scintillators, including solid plastic scintillators (e.g. NE102) and anthracene; inorganic scintillators including NaI(Tl), CsI(Tl), CsI(Na), and $BaF_2$.

In another embodiment, it is possible to position liquid scintillators between glass sheets to act as the gamma detector. These tend to use organic solvents formed with the anthracene molecule as their base with organometallic compounds to enhance scintillation efficiency and therefore are generally less easy to use than solid scintillators.

In one embodiment, the neutron detector may be comprised of binder molecules such as, but not limited to styrenes dissolved in suitable solvents as the base substrate. As the solvent evaporates, a plastic film forms which, once dry, is quite stable and self-supporting. The scintillation material (for example ZnS) and the neutron specific element (i.e. Gd, Li, B, etc.) are intermixed with the solvent and binder prior to solvent evaporation. As the solvent evaporates, an intimate mixture of all three components is formed.

In an alternative embodiment, a Gd, Li or B loaded liquid scintillator (generally based on the anthracene molecule with suitable organometallic compounds to increase scintillation efficiency) can be sealed in the gap between the gamma scintillation panels. Advantageously, a thin glass barrier will be placed between the neutron scintillator and the gamma-detector to prevent chemical interaction between the two scintillator materials.

In one embodiment, a typical panel size ranges from 0.1 m×0.1 m for handheld applications up to 2 m×1 m for large fixed site installations. Above this maximum size, light collection starts to become an issue as does physical handling and packaging. Below the minimum size, detection efficiency will start to drop below useful levels, resulting in increasingly long measurement times.

In one embodiment, the gamma detector is thicker than the neutron detector. The gamma detector thickness will advantageously be no less than 0.01 m (for hand held applications) up to 0.2 m for large fixed site systems. The front gamma detector may be optimized to a different thickness compared to the back gamma detector in order to maximize overall gamma and neutron detection efficiency. For example, a front gamma detector thickness of 0.05 m and a rear gamma detector thickness of 0.1 m would be applicable to a large fixed site system. The neutron detector will generally be thin to minimize gamma interaction probability and to maximize the chance of light escape from the scintillator. A typical neutron detector based on a solid screen scintillator would be in the range of 0.5-1 mm thick while a liquid neutron scintillator may be in the range of 0.01 to 0.05 m thick.

Optical signals from both the gamma detectors 101, 102 and the neutron detector 103 are readout by one or more photodetectors, which in one embodiment are photomultiplier tubes (PMTS) 104. The optical signals are thus converted to electronic signals which are then processed by a pulse processor 105 which assigns interactions separately due to gamma and neutron interactions 106 and 107, respectively.

In one embodiment, the gamma-sensitive 101 and 102 panels are advantageously fabricated from a plastic scintillator with a fast decay time, such as less than 0.1 μs. Further, the Li-6 or B-10 nuclei of the neutron detector 103 are advantageously mixed with a scintillation material having a slower decay time, such as ZnS. In one embodiment, the decay time for the scintillation material is greater than 1 μs. The difference in decay times for scintillators in gamma detectors and in neutron detector contributes to provide a significant separation between the gamma and neutron signatures 106 and 107. In general, it is desirable to select a scintillation material with low atomic number so as to minimise the probability of direct excitation by a passing gamma ray which causes enhanced gamma-neutron rejection.

In another embodiment, the Li-6 or B-10 is mixed with a material with very fast response (~10 ns) and surrounded by a material with slow response (~1 μs).

It may be noted that if material used around Li-6 is a very fast scintillator, the detector can measure neutrons at a very high counting rate, in particular when no scintillator is used to surround it.

One of ordinary skill in the art would appreciate that scintillation materials such as ZnS can absorb their own light, particularly when in the power form, and therefore there is a limit to the thickness of a scintillation based detector in ZnS. It may be noted that this thickness is typically only a few millimeters. Further, since light is emitted isotropically during each scintillation event, it is efficient to form the scintillator into a wide area screen where light emission can be captured from both sides of the screen simultaneously. Therefore, in one embodiment the scintillator based neutron detector 103 is designed as a screen with a wide area, such that light may be collected with a high efficiency from both sides of the screen.

It may be noted that the detection efficiency of a 1 mm thick Li-6/ZnS screen is of the same order as that of a pressurised He-3 gas proportional tube several cm in diameter. That is, the Li-6/Zns based neutron detector of the present invention offers equivalent or greater detection efficiency as compared to the pressurised He-3 gas tube detector, at a much reduced size.

Figure 2:
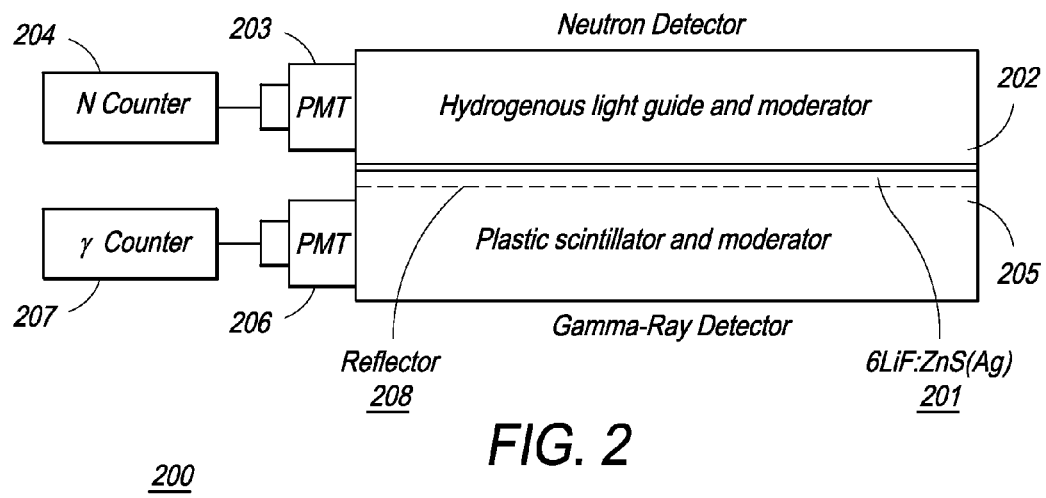
FIG. 2 illustrates an exemplary neutron detector based on mixtures of silver activated zinc sulfide.

Therefore, in one embodiment, a neutron detector is based on mixtures of silver activated zinc sulfide, ZnS(Ag), with the mixtures containing materials with high thermal neutron-capture cross section with emission of heavy particles, such as $^6$Li or $^{10}$B. That is, the mixtures consist of thermal neutron absorbers that produce heavy-particle emission following thermal capture. FIG. 2 illustrates one such exemplary neutron detector 200. Referring to FIG. 2, the detector 200 consists of one or more thin screens 201, comprising the ZnS(Ag) based mixtures, as described above. The screens 201, in one embodiment, have a thickness of about 0.5 mm and are embedded in a transparent hydrogenous light guide 202. Light guide 202 also serves as a neutron moderator. The light produced by neutron interaction in the ZnS(Ag) phosphorus screen is collected by the light guide 202 into a photodetector, such as a photomultiplier tube (PMT) 203, which produces a signal from which the neutrons are counted, using the counter 204.

The technology described above can also be implemented with simultaneous gamma-ray detection with the same basic electronics. Thus, the detector 200 further comprises a plastic scintillator 205, which serves as a gamma-ray detector and moderator. The plastic scintillator may be made up polyvinyl toluene or PVT, or any other suitable plastic scintillator material known in the art. Light produced by gamma-ray interactions in the scintillator 205 is detected by another PMT 206, which produces a signal from which the gamma-ray events are counted, using the counter 207. In one embodiment, counter 207 is a Multi-Channel Analyzer (MCA) that is used to measure the spectra of the gamma rays.

A reflector foil 208 is placed between the plastic scintillator 205 and the screen(s) 201 to prevent cross-contamination between optical signals from the neutron and gamma detection materials. Thus, the reflector is used to prevent light produced from the gamma rays to be collected with the same PMT as light produced by the neutrons. This prevents appearance of false neutron counts from gamma rays. Due to the reflector 208, some of the light produced by neutron interactions in the screen will be reflected back into the light guide.

The design of FIG. 2 provides a compact gamma-ray/neutron detector with the advantages of standard electronics and significantly high gamma-ray rejection. A small fraction of gamma rays will interact with the Li-6 sheet and will produce a low-intensity signal. This signal can be removed by thresholding, at the expense of some neutron detection. In one embodiment, a pulse shape discriminator can be employed within neutron channel 204 to enhance gamma-ray rejection.

Figure 3:
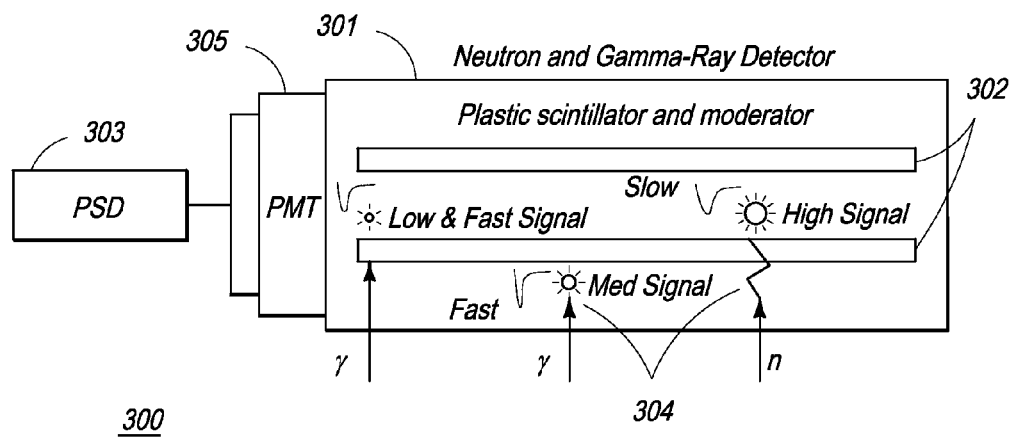
FIG. 3 illustrates an exemplary neutron detector based on mixtures of silver activated zinc sulfide that also uses a plastic scintillator for gamma ray detection.

Another exemplary detector 300 for simultaneous neutron and gamma-ray detection is shown in FIG. 3. In this case, the light guide material is replaced by a plastic scintillator 301, which serves as the gamma-ray detector, moderator and light guide. The detector 300 also includes screens 302, which are preferably thin and fabricated from ZnS(Ag) based mixtures for neutron detection. The neutrons and gamma-ray events are separated employing a Pulse-Shape Discrimination (PSD) circuit 303 between the pulses 304 generated from the ZnS(Ag) and plastic scintillator (PVT). Additionally, gamma-ray rejection is obtained as the light produced by electron interaction in the screen have similar decay time as the PVT's and will be eliminated with PSD. The light produced is transported via the transparent and neutron moderating medium 301 to a Photomultiplier Tube (PMT) 305 where the light is converted to a measurable signal to measure gamma as well as neutron events. The advantage of this hybrid neutron/gamma-ray detector approach is that the same PMT can be employed to measure the neutron as well as gamma events.

Figure 4:
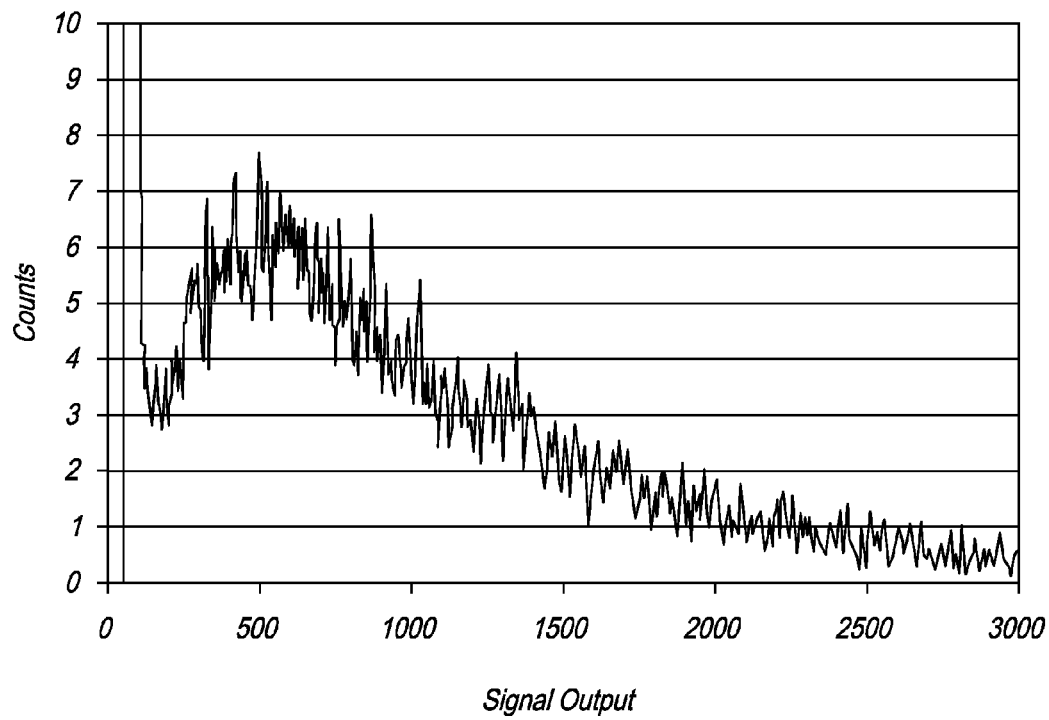
FIG. 4 illustrates experimental results with the silver activated zinc sulfide based neutron detector.

FIG. 4 illustrates the performance of an exemplary detector with a $^6$LiF:ZnS(Ag) screen embedded in a light-guide with two $^6$LiF concentrations and thickness. The results in FIG. 4 show the signal for the 1:2 weight ratio and screen thickness of 0.45 mm. Similar results were obtained with simulations employing 1, 2 and 3 $^6$LiF:ZnS(Ag) screens embedded in polyethylene, and detection efficiencies ranging from around 12% to 22% were obtained. One of ordinary skill in the art would appreciate that this efficiency is comparable to the highest efficiency achievable with closely-packed three rows $^3$He detectors, which is around 25%.

The signal distribution in FIG. 4 shows that not all the particle energy absorption is converted to light and that some of the light may be absorbed by the screen. This demonstrates the need for a comprehensive optimization where the right concentration of $^6$Li is obtained to produce high neutron absorption, while still having sufficient interactions in the scintillator to produce a sizeable light output. The screen thickness, the number of screens and moderator thickness are also important optimization parameters.

For applications focused on neutron detection, a major advantage of ZnS(Ag) phosphorus is the large light output for heavy particles compared with electrons produced by gamma-ray interactions. Also, due to the small thickness of the screen, the gamma-ray detection efficiency is low. Further, since the time-decay of the PVT light is ~3 ns, similar to that of the light produced by electrons in the ZnS(Ag) screen, PSD will also reject gamma rays interacting in the PVT.

In another embodiment of this invention, it is known that neutrons generated by radioactive materials of interest have a range of energies, and that the efficiency of neutron interaction in the detector will generally increase markedly as the energy of the interacting neutron decreases. For this reason, most He-3 detectors are located within a hydrogen rich moderating material, such as polythene, whose function is to promote neutron scattering of high energy neutrons such that they lose substantial amounts of energy in order to increase the probability of detection in the He-3 gas proportional counter. In the present invention, the gamma detector is advantageously designed to provide a dual function of gamma detection and neutron moderation to further improve the detection efficiency for neutrons. A plastic scintillator material is quite an efficient moderator as this feature is incorporated in the overall detector design.

Figure 5:
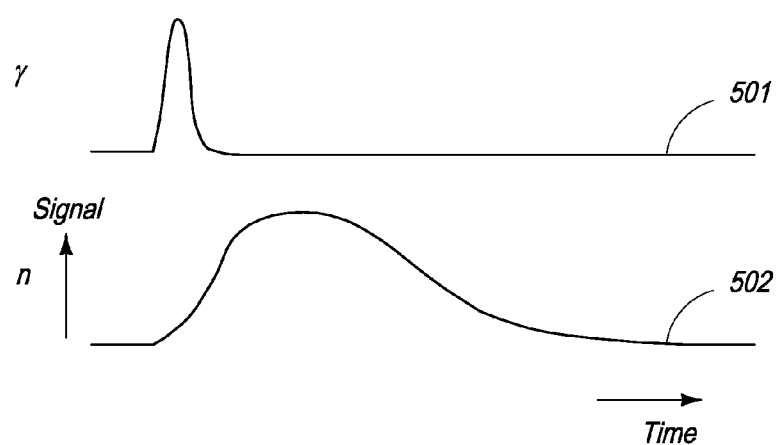
FIG. 5 illustrates pulse signals as a function of time for gamma interactions and neutron interactions, respectively.

FIG. 5 illustrates pulse signals, as a function of time corresponding to gamma interactions and neutron interactions in the composite detector of the present invention. Referring to FIG. 5, the scintillation characteristics curve 502 of the neutron sensitive scintillator is very different from the characteristics 501 of the surrounding gamma sensitive detector. These two characteristic signals 501 and 502, can be further tuned to exhibit a significant difference. This can be done by using appropriate pulse shape discrimination methods. Thus, in one embodiment of the present invention, both the total energy deposited in the detector and the types of interaction are determined. While the total energy can be determined by analysing the peak magnitude of the pulse signal, the type of interaction is determined by analysing the rate of decay of the scintillation pulse.

Figure 6:
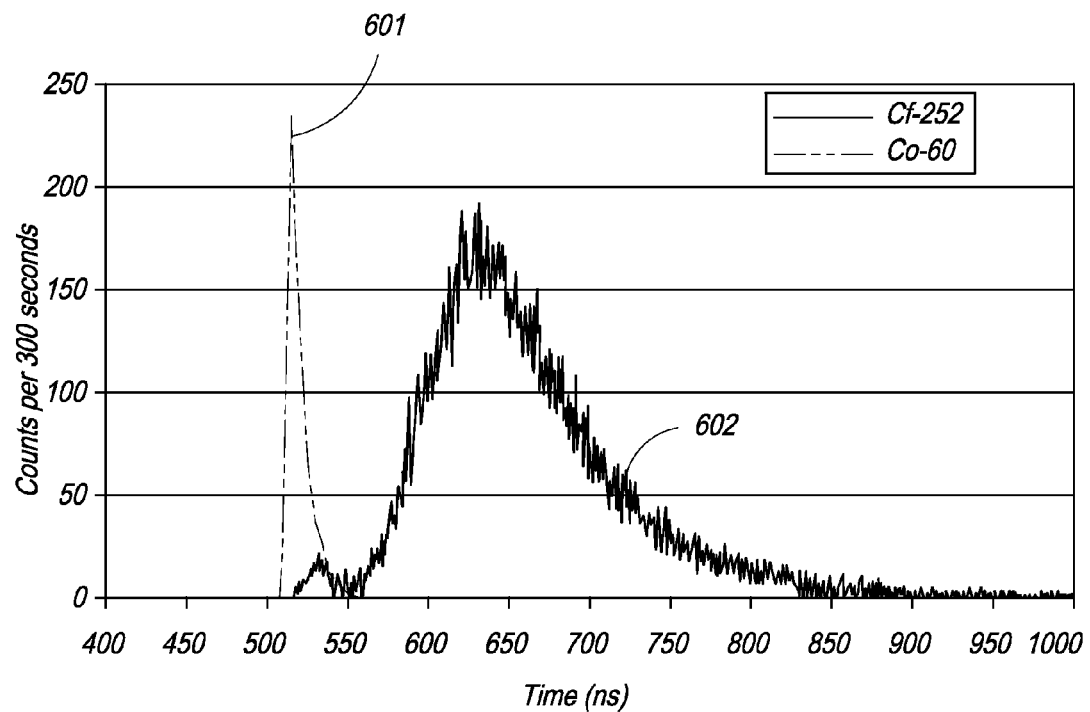
FIG. 6 illustrates discrimination between gamma ray and neutron measurement signals.

FIG. 6 illustrates the discrimination between gamma rays and neutrons for 252Cf and 60Co source, when analog Pulse-Shape Discrimination is applied to separate gamma rays from neutron events. While curve 601 reflects measurement of gamma rays emitted from 60Co source, curve 602 reflects measurement of neutrons emitted from 252Cf source. It would be apparent to those of ordinary skill in the art that the two curves are separate and distinctly identifiable.

In one embodiment, the gamma-ray rejection is improved by subtracting a calibrated fraction of gamma-ray counts from the measured neutron counts.

In one embodiment, the digital pulse processing is advantageously performed directly at the output of the detector. Since data rates can be quite high, processing at the detector helps filter the data down to a low bandwidth for transmission on to other processing systems. This data can be used to monitor the amount of radioactivity that is detected and to raise suitable alarms and/or display data by a number of means.

In yet another aspect of this invention, it is noted that the neutron reaction may also create an associated gamma-ray emission. For example in the reaction of a neutron with Gd-157, the excited Gd-158 nucleus decays with the emission of a gamma-ray. This gamma-ray is produced within a finite time of the neutron interaction and, therefore, it is possible to include the gamma-ray response that is measured in the surrounding gamma-detector in combination with the neutron scintillator response to produce a combined signal using the principle of pulse shape discrimination and time domain correlation.

Figure 7A:
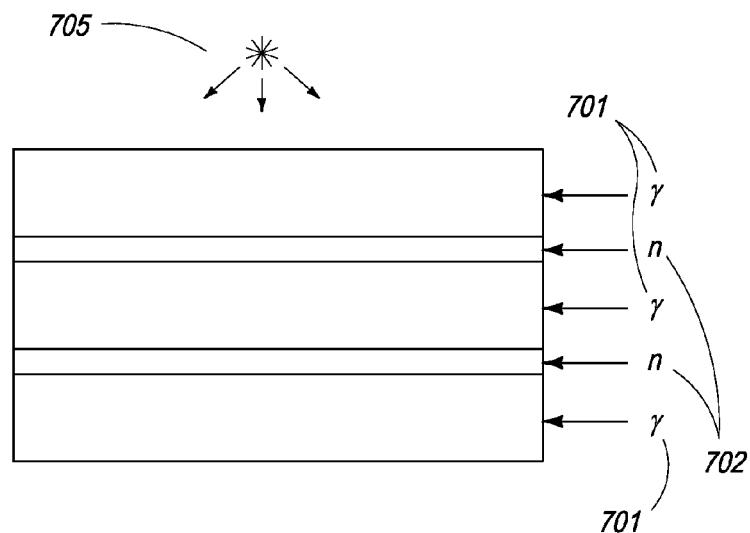
FIG. 7a illustrates one embodiment of the detector of present invention with multiple layers of gamma and neutron detector materials to increase neutron sensitivity.
Figure 7B:
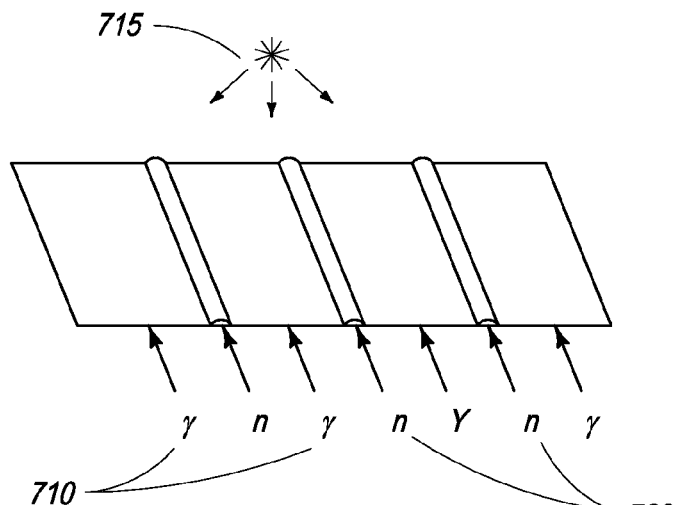
FIG. 7b illustrates another embodiment of the detector of present invention with angled detector slabs to increase neutron detection efficiency.

While FIG. 1 illustrates an exemplary configuration for a composite detector, alternative detector configurations may be established in order to further enhance neutron and gamma detection efficiency. Two exemplary alternative configurations are illustrated in FIGS. 7a and 7b. As shown in FIG. 7a, a first configuration combines multiple layers of gamma sensitive scintillator slabs 701 and neutron sensitive scintillator slabs 702 placed alternately with each other, in a direction substantially perpendicular to the direction of arrival of incident radiation 705. In this configuration, the efficiency of the gamma-neutron detector scales in proportion to the number of slabs of detector material; although this is a diminishing effect due to preferential absorption of radiation in the first layers of the detector compared to the later layers of the detector. Neutron sensitivity is significantly enhanced when the detector slabs are arranged in this configuration.

In another configuration shown in FIG. 7b, multiple layers of gamma detector materials 710 and neutron detector materials 720 are placed alternately with each other and are oriented at an angle to the direction of the incoming radiation 715. That is, layers 710 and 720 are not parallel to the direction of the incoming radiation 715. Such a detector configuration with angled detector slabs significantly increases neutron detection efficiency. This is because a neutron or photon in this case has a longer path length through each detector slab, which contributes to detection efficiency, as compared to the arrangement of slabs shown in FIG. 7a. However, this arrangement of detectors is also more expensive to fabricate and requires more extensive readout circuits.

One of ordinary skill in the art would appreciate that other configurations of scintillator materials and photo-detectors are possible, and any configuration may be selected depending upon its suitability to the application. Therefore, the composite gamma-neutron detector of the present invention described with reference to FIGS. 1 and 7 is not limited to plastic scintillator gamma detector with Li-6/ZnS neutron detector. In one embodiment for example, the composite detector may be configured using NaI(Tl) as the gamma detector, along with a lithium, boron or gadolinium based liquid scintillator with a very fast decay time. Here, the NaI (Tl) gamma detector will provide significant pulse height information about the gamma ray interaction while the neutron detector will continue to provide information about the incident neutron flux.

It shall be appreciated that the use of light reflective coatings with suitable optical coupling materials will improve overall light collection efficiency and hence the uniformity of response of the detector. It should also be understood that optical light guides and shaping of the scintillator materials may also be used to improve light collection efficiency of the detection system. Further, it should also be understood that the addition of radiation shielding materials such as lead, polythene and cadmium foil around the scintillation materials may be used to reduce the response of the detection system to naturally occurring background radiation.

In a further embodiment of the invention, a neutron scintillator can be used which provides different pulse shapes due to fast and thermal neutron interactions, where each pulse shape is different to that selected for the gamma detector.

Figure 8:
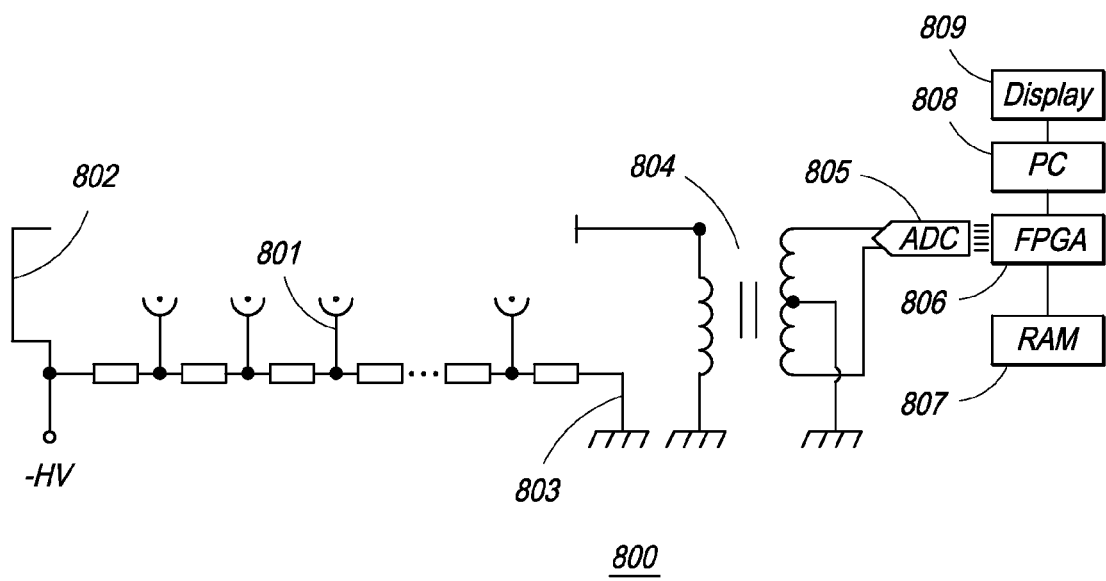
FIG. 8 illustrates an exemplary readout circuit used with the detection system of the present invention.

FIG. 8 illustrates an exemplary detector readout circuit architecture. Referring to FIG. 8, the circuit 800 comprises a photomultiplier tube (PMT) 801, which is operated with its cathode 802 held at negative high voltage with a grounded anode 803. The anode 803 is AC coupled using a transformer 804 to a high speed sampling analogue-to-digital converter (ADC) 805. The ADC 805 forms a time domain sample of the incoming signal from the PMT 801. In one embodiment, the ADC operates at a clock speed of 100 MHz or more to provide at most 10 ns sampling periods for accurate measurement of peak height and of the rise and fall decay times. In one embodiment, a filtering circuit is advantageously included between the PMT 801 and the input to the ADC 805 to act as a Nyquist filter to prevent unwanted aliasing in the sampled data. In one embodiment, an LCR multi-pole filter is implemented using the AC coupling transformer 804 as the inductive component.

In an alternate configuration, the PMT 801 may be d.c. coupled to the input of the ADC 805 using a high bandwidth analogue amplifier. A variety of other circuit configurations will be apparent to one skilled in the art.

The digital data produced by the ADC is advantageously passed directly to a digital processing circuit, such as a field programmable gate array (FPGA) 806. The FPGA provides high speed digital pulse shape processing and is configured to (1) record the time of arrival of a pulse, (2) determine the magnitude of the pulse and (3) determine the fall time of the pulse in order to discriminate between neutron and gamma interactions. This pulse-by-pulse data is histogrammed to a random access memory 807 and can subsequently be analysed by a software program running on a computer 808 to resolve detected count rates relative to a dynamically adjusted baseline. The result may be indicated to an operator through a visual display screen 809, a visual indicator, an audible sounder or any other suitable device in order to signal when a radioactive substance has been detected.

A variety of other methods to provide pulse-shape discrimination will be apparent to those of ordinary skill in the art.

Figure 9:
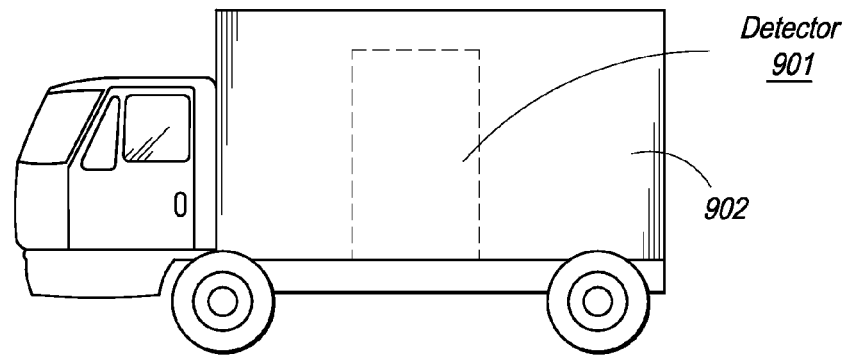
FIG. 9 illustrates an exemplary application of the gamma-neutron detector of the present invention in a drive-by vehicle.

FIG. 9 shows an application of a composite gamma-neutron detector in a mobile system, in a drive-by scanning configuration. Referring to FIG. 9, the gamma-neutron detector 901 is positioned in a vehicle 902. This configuration allows rapid re-location of the detector 901 from one site to another, and is also useful for covert scanning of vehicles as they pass along a road. In this embodiment, the vehicle 902 is driven to a location, such as a roadside, and the detection system 901 is activated. In one embodiment, one or more sensors (not shown) that are located on the vehicle 902 determine the presence of a passing object to be scanned, such as a passing vehicle, and the detection system 901 is turned on automatically. Once the vehicle has been scanned, the gamma-neutron detector 901 is turned off automatically. Once scanning at a given location is completed, the vehicle 902 can simply be driven to a new location and scanning can recommence as required. This feature provides the capability for random location scanning in a reasonably covert manner.

When not actively scanning a vehicle at the scanning site, the gamma-neutron detector in its off state is used to record the natural background radiation and this natural background rate is used to set an appropriate alarm threshold for when additional activity is detected in a passing vehicle during the on state of the scanner.

In another application, the composite gamma-neutron detector 901 is installed in a vehicle 902 that can be driven past stationary targets at a known velocity. As the vehicle 902 drives by, radiation emission data is collected in order to determine the presence of radioactive materials in the stationary object.

Figure 10:
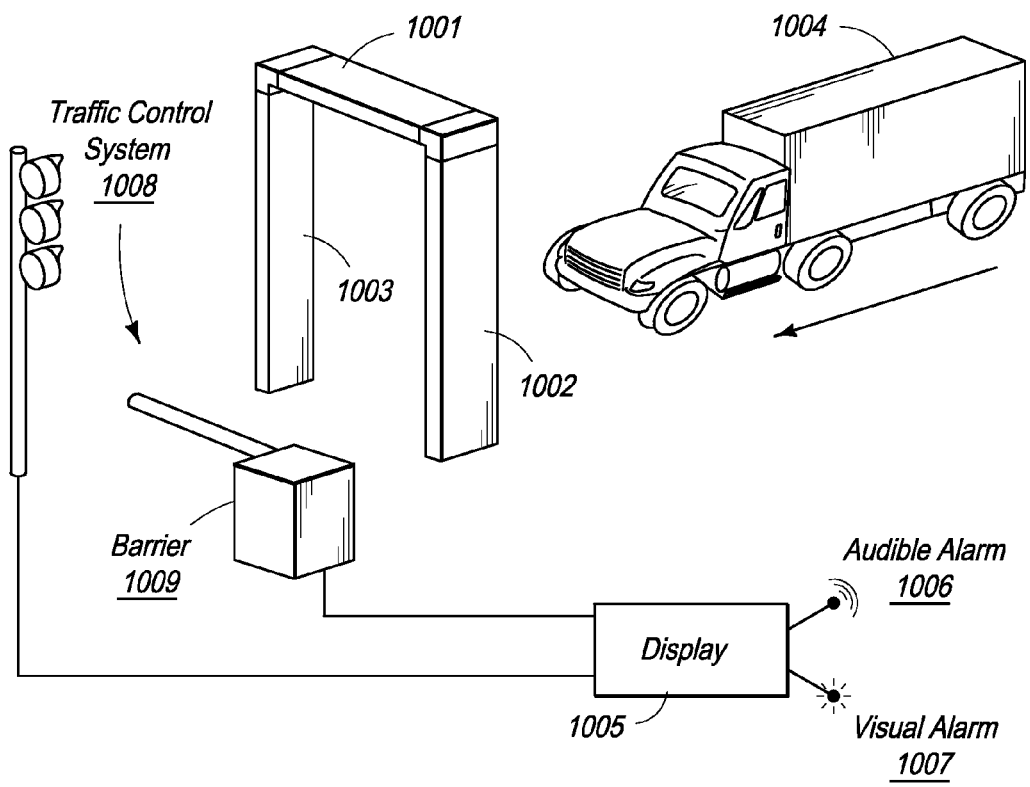
FIG. 10 illustrates another exemplary application of gamma-neutron detectors in a drive-thru scanning configuration.

FIG. 10 shows another application of one or more composite gamma-neutron detectors in a drive-through scanning configuration. Referring to FIG. 10, a plurality of composite gamma neutron detectors 1001, 1002 and 1003 are arranged as a fixed drive through system, in a portal configuration having a right, left, and top side, through which cargo vehicles such as 1004 can be driven. The signals from the detectors 1001, 1002 and 1003 are processed and the result can be seen on a display 1005. The display is also coupled to audible 1006 and visual 1007 alarms which are automatically generated, when radioactive material is suspected on the vehicle 1004 being scanned. The result on display 1005 and the alarms 1006 and 1007 may be used to determine if the vehicle 1004 needs further search, and the vehicle may be diverted to a holding area, for example, for a manual search. The drive through scanning system of FIG. 10 also employs a traffic control system 1008, which operates a barrier 1009 for stopping the vehicles for inspection. The barrier is lifted automatically once the scan results appear on the display 1005.

In an alternative configuration, one or more gamma-neutron detectors of the present invention are installed with a baggage handling system employed at airports. In this manner, the system of present invention may also be used for detection of radioactive materials in baggage passing through an airport terminal. In another alternative configuration, one or more gamma detectors of the present invention can be installed in air cargo facilities and at the entrance of scrap metal facilities.

Figure 11:
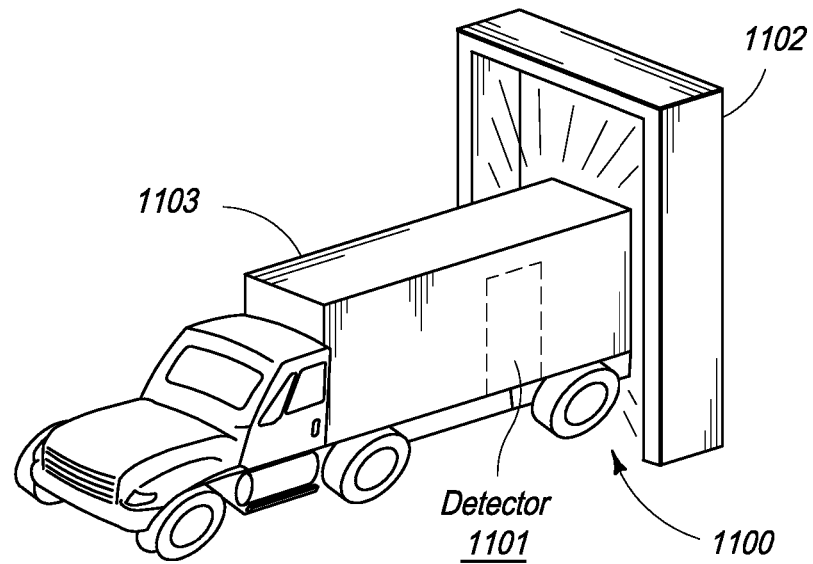
FIG. 11 illustrates yet another exemplary application of the gamma-neutron detector combined with a mobile X-ray scanner for generating composite gamma-neutron X-ray images.

In a further embodiment of the present invention, a gamma-neutron detector is combined with a mobile X-ray scanner for generating composite gamma-neutron X-ray images. This is illustrated in FIG. 11. Referring to FIG. 11, a gamma-neutron detector 1101 is installed on a mobile X-ray scanner 1100. The mobile X-ray scanner 1100 further comprises an X-ray scanning system 1102 mounted on a vehicle 1103. In this case, the radioactive signal from the gamma-neutron detector 1101 is acquired simultaneously with a transmission X-ray image from the X-ray scanning system 1102. This allows signals from the gamma-neutron detector 1101 to be correlated with the X-ray image data to help the operator locate the presence of a radioactive material within the load under inspection. Any of the mobile systems disclosed in U.S. patent application Ser. Nos. 10/201,503; 10/600,629; 10/915,687; 10/939,986; 11/198,919; 11/622,560; 11/744,411; 12/051,910; 12/263,160; 12/339,481; 12/339,591; 12/349,534; 12/395,760; and 12/404,913, all of which are incorporated herein by reference, can be used.

Figure 12:
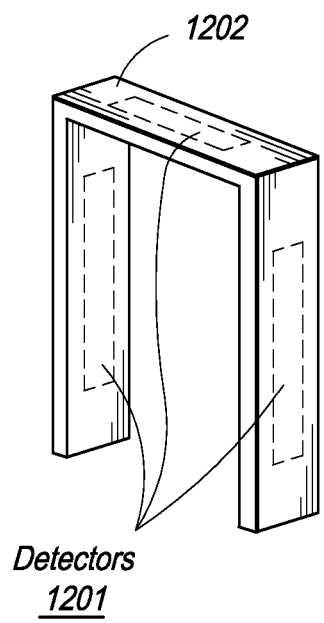
FIG. 12 illustrates another embodiment of the combined gamma-neutron detector and based X-ray imaging system in a portal or gantry configuration.

In yet another embodiment, the gamma-neutron detector of the present invention is combined with an X-ray imaging system, in a portal or gantry configuration. Referring to FIG. 12, a plurality of gamma-neutron detectors 1201 are co-located with a transmission X-ray system 1202 arranged in a portal configuration. Objects or vehicles under inspection can be passed through this portal or gantry. This mode of operation again allows the radioactive signals to be correlated with an X-ray image of the object under inspection thereby increasing detection efficiency. For example, the occurrence of a high-attenuation area observed in the X-ray image and a small increase in gamma-ray and/or neutron signal below the threshold could indicate the presence of a shielded radioactive source.

Figure 13:
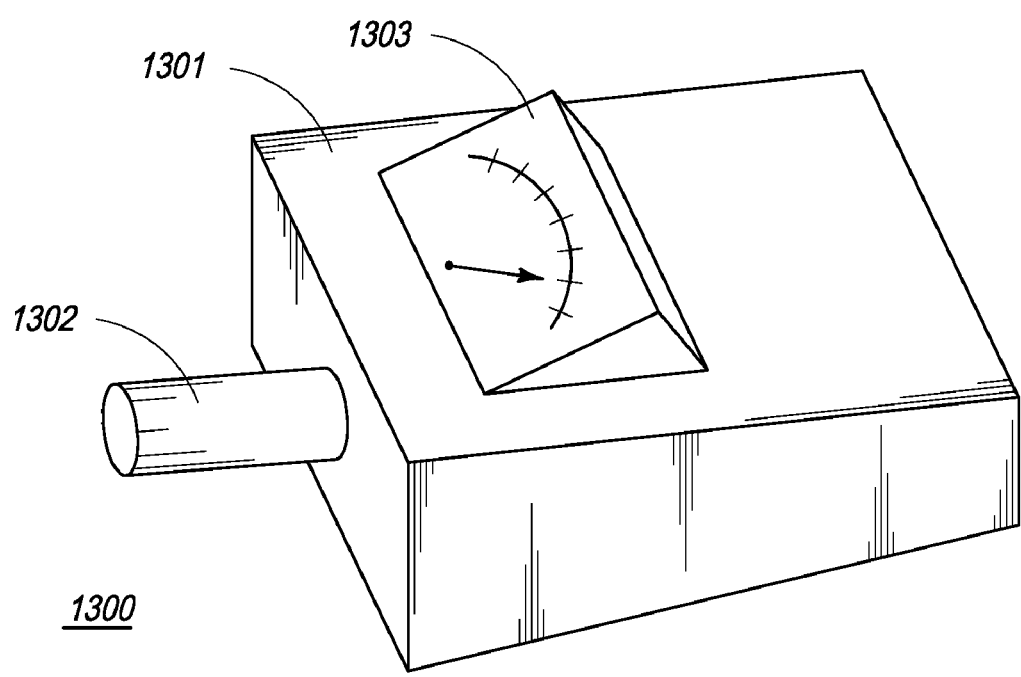
FIG. 13 illustrates the gamma-neutron detector in a portable configuration, according to one embodiment of the present invention.

FIG. 13 shows another embodiment of a gamma-neutron detector in a portable, hand-held configuration. Referring to FIG. 13, a gamma-neutron detection instrument 1300 is shown. The instrument comprises a main unit 1301 and a handle 1302. In one embodiment, the scintillation panels of the composite gamma-neutron detector (not shown) are located in the main unit 1301, while the electronics and battery are advantageously located in the handle 1302 of the instrument. An embedded indicator 1303 provides feedback to the operator on the amount of radiation present in the vicinity of the instrument 1300. This configuration is very useful for random searching, especially small objects and in searching nooks and corners within a vehicle.

The novel approach of the present invention combines a neutron scintillation detector with a gamma detector to form a hybrid gamma-neutron detector. This approach provides the advantage of detecting dual signatures, thereby increasing detection efficiency. Further, by using the method of pulse shape discrimination, the system of present invention also provides an excellent separation of the neutron signal from the gamma signal. The system of present invention may be used in various configurations, depending upon the application, including but not limited to, fixed, drive-through portal, gantry, portable and hand-held. The combined detector can be used for sea cargo inspection, and vehicle inspection in land crossings and scrap-metal facilities, in baggage and air cargo scanning, and other applications. The combined neutron-gamma detector of the present invention and/or the neutron detector portion and/or the gamma detector portion is further designed to meet ANSI standards for radiation detection.

Compared to He-3 based systems, which face a problem due to short supply of He-3, the present invention does not limit the use of the system with a particular nucleus. As mentioned previously, any suitable material with high neutron thermal capture cross-section with emission of particles, such as Lithium (Li-6), Boron (B-10), Cadmium (Cd), Gadolinium (Gd), and Helium (3-He) may be used for radioactive material detection with the system of present invention. This feature helps to keep cost and supply under control. Further, the combined gamma-neutron detector of the present invention is more compact and lighter as compared to He-3 based systems, as the detector of present invention only uses, in one embodiment, one set of electronics whereas He-3 based systems multiple sets of electronics are employed. It should be noted herein that in other embodiments, the present invention may be used with a plurality of electronic sets.

Most Radiation Portal Monitors (RPM) deployed around the world employ plastic scintillators to detect gamma rays and moderated $^3$He detectors to measure neutrons. It is important to note that in typical RPMs, only one or two $^3$He tubes are used per module with a suboptimal moderating configuration to reduce cost. This results in a neutron detection efficiency of few percent.

The proposed neutron detector can replace $^3$He detectors in Radiation Portal Monitors (RPMs) as its neutron detection and gamma-ray rejection capabilities are similar to that of $^3$He. Further, the detectors of present invention do not contain hazardous materials, are commercially available, do not require special transport permits, are very rugged—mechanically as well as environmentally, and are easy to manufacture at a reasonable cost. The detectors are also suitable for handheld and backpack detectors, where efficiencies exceed that of $^3$He. Finally, the present approach is suitable for integrated neutron and gamma-ray detectors, as it employs a single PMT with relatively simple and compact electronics.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A system for detection of neutrons and gamma rays, comprising:
    a plurality of scintillator screens comprising thermal neutron absorber materials, said materials interacting with neutrons to emit heavy particles, and said heavy particles interacting with scintillator screens to produce light,
    a plurality of light guides into which said scintillator screens are embedded, said light guides serving as a neutron moderating medium,
    a first photodetector which receives the produced light through said light guides, and converts the light to a measurable signal,
    a plastic scintillator for producing light on interaction with gamma-rays,
    a reflector placed between said plastic scintillator and said scintillator screens to prevent cross-contamination between optical signals from the neutron and gamma detection materials, wherein the reflector is positioned in parallel to said plastic scintillator and said scintillator screens,
    a second photodetector which collects the produced light from said plastic scintillator, and converts the light to a measurable signal, and
    a first counter and a second counter for counting pulses generated by the first photodetector and the second photodetector, respectively.

2. The system of claim 1 wherein the second counter is a Multi-Channel Analyzer (MCA) that is used to measure the spectra of the gamma rays.

3. The system of claim 1, wherein the thermal neutron absorber materials comprise $^6$Li or $^{10}$B.

4. The system of claim 1, wherein said plastic scintillator comprises of polyvinyl toluene (PVT).

5. The system of claim 1 further comprising a Pulse-Shape Discrimination (PSD) circuit that separates the neutron and gamma-ray events measured by the first photodetector.

6. The system of claim 1, wherein the plurality of scintillator screens comprise silver activated zinc sulfide (ZnS(Ag)) phosphorous.

7. The gamma-neutron detector of claim 1 wherein each of the plurality of scintillator screens comprise neutron sensitive material having a density of up to 30% by volume of the scintillator screen.

8. The system of claim 1 wherein the plastic scintillator comprises at least one of an organic solid scintillator, an inorganic solid scintillator, or a liquid scintillator positioned between glass layers.

9. The system of claim 1 further comprising a second gamma-sensitive scintillation panel.

10. The system of claim 9 wherein the plastic scintillator and second gamma-sensitive scintillation panel are thicker than each of said plurality of scintillator screens.

11. The system of claim 9 wherein the plastic scintillator and second gamma-sensitive scintillation panel have a faster decay time than the neutron detector.

12. The system of claim 9 wherein the plastic scintillator, second gamma sensitive scintillation panels and at least one neutron detector are angled relative to a direction of incoming radiation.

13. The system of claim 1 wherein pulse shapes of the generated measurable signals are analyzed to discriminate between gamma interactions and neutron interactions.

14. A portal gantry detection system having a top, right, and left side wherein said top, left, and right sides each comprise the system of claim 1.

15. A mobile detection system comprising a boom wherein said boom comprises the system of claim 1.

* * * * *